E. MOORE.
SAW SET.
APPLICATION FILED AUG. 29, 1916.

1,254,427.

Patented Jan. 22, 1918.

WITNESSES
F. H. Taylor
Lloyd W. Patch

INVENTOR
Edward Moore

ATTORNEY

UNITED STATES PATENT OFFICE.

EDWARD MOORE, OF CUMBERLAND, MARYLAND.

SAW-SET.

1,254,427. Specification of Letters Patent. Patented Jan. 22, 1918.

Application filed August 29, 1916. Serial No. 117,525.

*To all whom it may concern:*

Be it known that I, EDWARD MOORE, a citizen of the United States, residing at Cumberland, in the county of Allegany and State of Maryland, have invented certain new and useful Improvements in Saw-Sets, of which the following is a specification.

This invention relates to an improvement in saw sets of the type particularly adapted for use by individual users of saws and so arranged that it may be conveniently used without any special knowledge of mechanics or without special equipment.

An object of my invention is to provide a simple and inexpensive saw set which is so arranged that it may be manually used to set the saw teeth to adapt the same for the particular requirement of the individual making use of the saw.

A further object is to so construct the device that it is adaptable for use upon saws having fine or coarse teeth and has the means by which the teeth are bent so arranged that adjacent teeth are offset to opposite sides of the blade thus making it necessary to work over the saw blade in one direction only and with a single operation to accomplish the set on both sides of the blade.

With the above and other objects in view, my invention consists in certain novel features of construction and combinations of parts which will be hereinafter set forth in connection with the drawings and then more particularly pointed out in the claims.

The device may be stamped, forged, or otherwise formed from a single piece of material, and in the preferred embodiment the central portion 1 is made preferably substantially rectangular and has the side extensions 2 and 3 disposed substantially centrally from the long side so that it presents a structure in which the body portion 1 extends on each side of the portions 2 and 3 to present wings which may be grasped and held in the use of the device. The extensions 2 and 3 have the diagonally opposite corners cut away as shown at 4 and 5, and the extensions are thus so formed that diagonally opposite corners are notched out whereas the remaining corners are solid, the notching being preferably reduced to run out at the edges of the extension as shown in Fig. 1, and maintained of the same depth throughout their extent so that the faces as indicated at 6 and 7 are in the same plane throughout.

Figure 1:
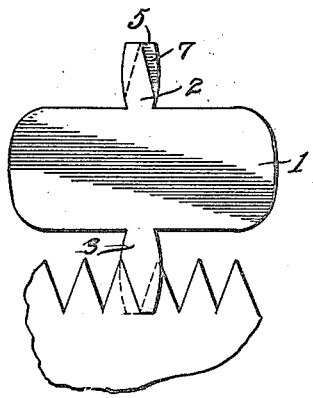
Figure 1 is a view in elevation of the device of my invention with a fragmentary portion of a saw blade illustrated to show the manner of using the device.
Figure 2:
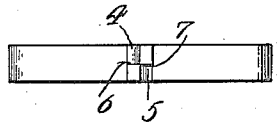
Fig. 2 is a top edge view.
Figure 3:
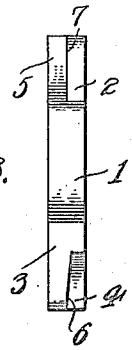
Fig. 3 is an end edge view.

As is shown in Fig. 1, it is preferable that the extension 3 be made slightly larger than the extension 2 so that a fine saw, such as a hack saw, or a saw having coarser teeth after the manner of a hip saw can be set with equal facility and by the use of the same tool, it of course being understood that the shape of the body of the tool might be varied and that still other extensions of various sizes might be provided therearound. In the use of the device, the body portion 1 will be grasped and with one of the extensions toward the toothed edge of a saw blade, the notched end of the extension is brought between two teeth so that the edges 6 and 7 are on opposite sides of the adjacent teeth. With the parts in this relation, cutting force exerted upon the tool to cause clutching of the same to bring the edges 6 and 7 against the saw teeth will cause these teeth to be slightly bent over or swaged to give the proper "set" to the saw. This operation may be continued throughout the length of the saw and thus it will be seen that a single operation will give the proper bend to two adjacent teeth to offset the same to opposite sides and thus it will be necessary to work over the saw blade only once as distinguished from the usual method of setting a saw which requires that the teeth on one side be set and that the alternate teeth then be offset to the opposite side.

While I have herein shown and described the device as being constructed from a piece of metal which is cut away to form the notches at one side, it will be understood that the structure might be drop forged to have this form or cast and that the tooth might even be constructed from a piece of sheet metal which would be stamped to secure the proper formation of the extensions 2 and 3, and also it will be apparent that variations might be resorted to in the shape and design of the tool without departing from the spirit and scope of my invention, in view of which fact I do not wish to be limited to the exact disclosure but only to such points as may be set forth in the claims.

I claim:

1. A saw set comprising a body portion having an extension therefrom, and said extension notched on diagonally opposite corners to give shape to the extension that the same may be fitted between adjacent teeth of a saw and upon turning of the tool will bend the adjacent teeth to be offset in opposite directions.

2. A saw set comprising a body portion having extensions formed on the sides thereof in such relation that wings are provided by which the tool may be held and manipulated, and said extensions having diagonally opposite corners notched out in such relation that these notched ends may be placed to be received between adjacent teeth of a saw and as turning and twisting movement is given to the tool the adjacent teeth will be offset to opposite sides.

In testimony whereof I affix my signature in presence of two witnesses.

EDWARD MOORE.

Witnesses:
WILLIAM M. SCHRIVER,
ISAAC CLAY.

Copies of this patent may be obtained for five cents each, by addressing the "Commissioner of Patents, Washington, D. C."